US011763037B2

(12) United States Patent
Xue et al.

(10) Patent No.: US 11,763,037 B2
(45) Date of Patent: Sep. 19, 2023

(54) POWER GLITCH SIGNAL DETECTION CIRCUIT, SECURITY CHIP AND ELECTRONIC APPARATUS

(71) Applicant: SHENZHEN GOODIX TECHNOLOGY CO., LTD., Shenzhen (CN)

(72) Inventors: Jianfeng Xue, Shenzhen (CN); Jiang Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 607 days.

(21) Appl. No.: 17/026,211

(22) Filed: Sep. 19, 2020

(65) Prior Publication Data

US 2021/0004501 A1 Jan. 7, 2021

Related U.S. Application Data

(63) Continuation of application No. PCT/CN2019/092499, filed on Jun. 24, 2019.

(51) Int. Cl.
*G06F 1/00* (2006.01)
*G06F 21/76* (2013.01)
(Continued)

(52) U.S. Cl.
CPC ....... *G06F 21/76* (2013.01); *G01R 19/16519* (2013.01); *G06F 1/28* (2013.01); *G06F 21/79* (2013.01); *H02M 7/5387* (2013.01)

(58) Field of Classification Search
None
See application file for complete search history.

(56) References Cited

U.S. PATENT DOCUMENTS 5,374,923 A 12/1994 Sakamoto
5,703,510 A 12/1997 Iketani et al.
(Continued)

FOREIGN PATENT DOCUMENTS

CN 2922277 Y 7/2007
CN 101943728 A 1/2011
(Continued)

OTHER PUBLICATIONS

Beringuier-Boher, Noémie et al., "Voltage Glitch Attacks on Mixed-Signal Systems," 2014 17th Euromicro Conference on Digital System Design, IEEE, Aug. 27, 2014, pp. 379-386, doi: 10.1109/DSD.2014.14 [retrieved on Oct. 16, 2014].
(Continued)

*Primary Examiner* — Nitin C Patel

(57) ABSTRACT

A power glitch signal detection circuit, a security chip and an electronic apparatus are disclosed. The power glitch signal detection circuit includes a voltage sampling module, wherein the voltage sampling module includes: a first metal oxide semiconductor MOS transistor and a capacitor for sampling a power supply voltage, wherein a gate terminal of the first MOS transistor is connected to the capacitor, a source terminal of the first MOS transistor is connected to a ground voltage. The power glitch signal detection circuit further comprises a second MOS transistor and a signal output module. One terminal of the second MOS transistor is connected to a gate terminal of the first MOS transistor, another terminal of the second MOS transistor is connected to the power supply voltage, and a drain terminal of the second MOS transistor is connected to a drain terminal of the first MOS transistor.

20 Claims, 4 Drawing Sheets

(51) Int. Cl.
*G01R 19/165* (2006.01)
*G06F 21/79* (2013.01)
*H02M 7/5387* (2007.01)
*G06F 1/28* (2006.01)

(56) References Cited

U.S. PATENT DOCUMENTS

| | | |
|---|---|---|
| 6,751,079 B2 | 6/2004 | Bretschneider |
| 6,990,010 B1 | 1/2006 | Plants |
| 7,085,979 B2 * | 8/2006 | Kim .............. G06K 19/073 |
| | | 714/733 |
| 7,126,842 B2 | 10/2006 | Plants |
| 7,301,320 B2 | 11/2007 | Dreps et al. |
| 7,403,411 B1 | 7/2008 | Plants |
| 7,409,659 B2 | 8/2008 | Chakraborty et al. |
| 7,672,153 B2 | 3/2010 | Plants |
| 7,719,325 B1 | 5/2010 | Wang et al. |
| 10,156,595 B2 * | 12/2018 | Nirwan .............. G01R 29/0276 |
| 10,277,213 B1 | 4/2019 | Kimelman |
| 10,768,229 B2 * | 9/2020 | Borrel .............. G01R 31/40 |
| 2006/0107245 A1 | 5/2006 | Chakraborty et al. |
| 2006/0126376 A1 | 6/2006 | Plants |
| 2006/0164059 A1 | 7/2006 | Dreps et al. |
| 2008/0012603 A1 | 1/2008 | Wadhwa et al. |
| 2008/0018368 A1 | 1/2008 | Wadhwa et al. |
| 2008/0061843 A1 | 3/2008 | Yanci |
| 2008/0298116 A1 | 12/2008 | Plants |
| 2010/0123501 A1 | 5/2010 | Wang et al. |
| 2013/0193981 A1 | 8/2013 | Chen et al. |
| 2019/0131960 A1 | 5/2019 | Kimelman |

FOREIGN PATENT DOCUMENTS

| | | |
|---|---|---|
| CN | 101996580 A | 3/2011 |
| CN | 101943729 B | 3/2012 |
| CN | 103034804 A | 4/2013 |
| CN | 103675421 A | 3/2014 |
| CN | 104166053 A | 11/2014 |
| CN | 104459564 A | 3/2015 |
| CN | 104639122 A | 5/2015 |
| CN | 104714193 A | 6/2015 |
| CN | 103034804 B | 12/2015 |
| CN | 204964722 U | 1/2016 |
| CN | 106571803 A | 4/2017 |
| CN | 104459564 B | 9/2017 |
| CN | 108139507 A | 6/2018 |
| CN | 108169694 A | 6/2018 |
| CN | 108508953 A | 9/2018 |
| CN | 108599757 A | 9/2018 |
| CN | 109257036 A | 1/2019 |
| CN | 109314464 A | 2/2019 |
| CN | 109541288 A | 3/2019 |
| CN | 109709475 A | 5/2019 |
| JP | 2004236407 A | 8/2004 |
| KR | 20000007158 A | 2/2000 |

OTHER PUBLICATIONS

Liu Faen "Key Technique Research for RF and Millimeter-wave PLL Integrated Circuits Based on CMOS Technology" Chinese Doctoral Dissertations & Master's Theses Full-text Database (Doctor)—Information Science and Technology, Aug. 5, 2016, pp. I-126.

Fu Qiang et al. "Intelligent Switcher Design in Water and Fertilizer Integration Equipment." Transactions of the Chinese Society for Agricultural Machinery S1(2015):108-115, Dec. 30, 2015, pp. 108-115.

* cited by examiner

POWER GLITCH SIGNAL DETECTION CIRCUIT, SECURITY CHIP AND ELECTRONIC APPARATUS

CROSS REFERENCE TO RELATED APPLICATIONS

The present disclosure is a continuation of international application No. PCT/CN2019/092499, filed on Jun. 24, 2019, which is hereby incorporated by reference in its entirety.

TECHNICAL FIELD

Embodiments of the present invention relate to the field of electronic technologies, and in particular, to a power glitch signal detection circuit, a security chip and an electronic apparatus.

BACKGROUND

A security chip can be used to implementation functions such as user identification and key data storage, which is widely used in a financial field. A security chip is a key target of an attacker.

The attacker may make the chip work in an abnormal state by a fault attack (such as a power glitch attack), which leads to a wrong operation of the chip. At this point, the attacker can easily obtain confidential data in the security chip using a fault analysis technology.

Under normal conditions, a glitch signal detection circuit can detect a power glitch on power supply voltage (or ground voltage), and give an alarm signal in time, thereby increasing the robustness and safety of the system on chip. Specifically, the glitch signal detection circuit needs structures including a resistance-capacity (RC) sampling structure and a comparator structure. The RC sampling structure samples the power supply voltage (or ground voltage) using a low-pass filter, and the comparator structure sets a decision threshold with a resistor divider and decides whether to trigger an alarm by comparing the sampled power supply voltage (or ground voltage) with the decision threshold. The advantage of the RC sampling structure is that it can a detect nanosecond (ns)-level power glitch, but the RC sampling structure with a larger RC generally requires a larger area overhead. The advantage of the comparator structure is that the decision threshold can be set accurately, but a static bias current in the comparator structure may cause a static bias power consumption. In addition, the power glitch signal detection circuit in prior art has disadvantages of low reaction rate, low sensitivity and poor portability.

SUMMARY

The present disclosure provides a power glitch signal detection circuit, a security chip and an electronic apparatus, which could detect a power glitch on power supply voltage or ground voltage, and the power glitch signal detection circuit has the advantages of low power consumption, small area, high speed, high sensitivity and strong portability.

In a first aspect, a power glitch signal detection circuit is provided, comprising,
a voltage sampling module, wherein the voltage sampling module includes:
a first metal oxide semiconductor MOS transistor and a capacitor for sampling a voltage of the power supply voltage, wherein a gate terminal of the first MOS transistor is connected to the capacitor, a source terminal of the first MOS transistor is connected to a ground voltage, when there is no power glitch signal on the power supply voltage and no power glitch signal on the ground voltage, a voltage value of a drain terminal of the first MOS transistor equals to the ground voltage, and a voltage value of the gate terminal of the first MOS transistor equals to a power supply voltage sampled by the capacitor;
wherein the power glitch signal detection circuit further comprising a second MOS transistor and a signal output module,
wherein a terminal of the second MOS transistor is connected to the gate terminal of the first MOS transistor, another terminal of the second MOS transistor is connected to the power supply voltage, and a drain terminal of the second MOS transistor is connected to the drain terminal of the first MOS transistor;
and the signal output module is configured to generate and output a target signal according to change of a voltage value of the drain terminal of the second MOS transistor, and the target signal is used to indicate whether there is a power glitch signal on the power supply voltage or the ground voltage.

A power supply voltage sampled by the capacitor that is not affected by the power glitch signal may be obtained, with the gate terminal of the first MOS transistor being connected to the capacitor; the voltage of the drain terminal of the first MOS transistor can be reset to prevent the drain terminal of the first MOS transistor from being in a high-impedance floating state, with the first MOS transistor being connected to the ground voltage. Thereby when there is no power glitch signal on the power supply voltage and no power glitch signal on the ground voltage, the voltage value of the drain terminal of the first MOS transistor is the ground voltage, and the voltage value of the gate terminal of the first MOS transistor is the power supply voltage sampled by the capacitor. Further, it is equivalent that the working state of the second MOS transistor is controlled by the power glitch signal, with a terminal of the second MOS transistor being connected to the gate terminal of the first MOS transistor and another terminal of the second MOS transistor being connected to the power supply voltage, thereby the signal output module may generate and output the target signal according to change of the voltage value of the drain terminal of the second MOS transistor.

Sampling a power supply voltage based on the capacitor is different from the traditional RC sampling structure. Specifically, sampling a power supply voltage based on the capacitor does not need to use a resistor so that the area and hardware overhead of the power glitch signal detection circuit can be reduced. Besides, with the working state of the second MOS transistor being controlled by the power glitch signal, detecting the voltage of the drain terminal of the second MOS transistor by the signal output module, can effectively improve the detection speed and the sensitivity. The static current of the power glitch signal detection circuit is only the leakage current of the used device, and there is no static bias current, which can reduce static power consumption of the power glitch signal detection circuit. In addition, the power glitch signal detection circuit can be compatible with a digital (Complementary Metal-Oxide-Semiconductor Transistor, CMOS) process, which can enhance the portability of the glitch signal detection circuit. In short, the power glitch signal detection circuit could detect a power glitch on the power supply voltage or the ground voltage, and the power glitch signal detection circuit has the advantages of low power consumption, small area, high speed, high sensitivity and strong portability.

In some possible implementation manners, a gate terminal of the second MOS transistor is connected to the gate terminal of the first MOS transistor, and a source terminal of the second MOS transistor is connected to the power supply voltage.

In some possible implementation manners, when there is no power glitch signal on the power supply voltage and no power glitch signal on the ground voltage, then the voltage value of the drain terminal of the second MOS transistor does not change, and the signal output module is configured to generate and output a first signal, and the first signal is used to indicate that there is no power glitch signal on the power supply voltage or the ground voltage; when there is a power glitch signal on the power supply voltage and/or a power glitch signal on the ground voltage, then the voltage value of the drain terminal of the second MOS transistor changes, and the signal output module is configured to generate and output a second signal, and the second signal is used to indicate that there is a power glitch signal on the power supply voltage or the ground voltage.

For example, when there is a positive power glitch signal on the power supply voltage, a voltage of the source terminal of the second MOS transistor increases and a voltage of the gate terminal does not change, thereby leading to increase of the voltage of the drain terminal; when there is a negative power glitch signal on the ground voltage, because of the capacitor coupling, the voltage of the gate terminal of the second MOS transistor decreases, and the voltage of the source terminal does not change, thereby leading to increase of the voltage of the drain terminal of the second MOS transistor. It is equivalent that the working state of the second MOS transistor is controlled by a power glitch signal, that is, the signal output module can generate and output the target signal according to change of the voltage value of the drain terminal of the second MOS transistor.

In some possible implementation manners, the power glitch signal detection circuit further comprises:
    a third MOS transistor, wherein a gate terminal of the third MOS transistor is connected to the power supply voltage, a source terminal of the third MOS transistor is connected to the gate terminal of the second MOS transistor, and a drain terminal of the third MOS transistor is connected to the drain terminal of the first MOS transistor.

In some possible implementation manners, when there is no negative power glitch signal on the power supply voltage and no positive power glitch signal on the ground voltage, then the voltage value of the drain terminal of the third MOS transistor does not change, and the signal output module is configured to generate and output a third signal, and the third signal is used to indicate that there is no power glitch signal on the power supply voltage or the ground voltage; when there is a negative power glitch signal on the power supply voltage and/or a positive power glitch signal on the ground voltage, then the voltage value of the drain terminal of the third MOS transistor changes, and the signal output module is configured to generate and output a fourth signal, and the fourth signal is used to indicate that there is a power glitch signal on the power supply voltage or the ground voltage.

For example, when there is a negative power glitch signal on the power supply voltage, a voltage of the source terminal of the third MOS transistor does not change, and because of decrease of a voltage of the gate terminal, then the voltage of the drain terminal increases; when there is a positive power glitch signal on the ground voltage, the voltage of the gate terminal of the third MOS transistor does not change, and because of increase of the voltage of the source terminal due to the capacitive coupling, then the voltage of the drain terminal of the third MOS transistor increases. It is equivalent that the working state of the third MOS transistor is controlled by a power glitch signal. Thus, the signal output module is configured to generate and output the target signal according to change of the voltage value of the drain terminal of the third MOS transistor.

In some possible implementation manners, the source terminal of the second MOS transistor is connected to the gate terminal of the first MOS transistor, and the gate terminal of the second MOS transistor is connected to the power supply voltage.

In some possible implementation manners, the power glitch signal detection circuit comprises:
    a fourth MOS transistor, wherein a terminal of the capacitor connected to the gate terminal of the first MOS transistor is connected to the power supply voltage through the fourth MOS transistor, and another terminal of the capacitor is connected to the ground voltage.

The capacitor can be configured to sample the power supply voltage by controlling the turn-on and turn-off of the fourth MOS transistor.

In some possible implementation manners, the power glitch signal detection circuit further comprises:
    a fifth MOS transistor, wherein the drain terminal of the first MOS transistor is connected to the ground voltage through the fifth MOS transistor.

The voltage of the drain terminal of the first MOS transistor can be reset to prevent the drain terminal of the first MOS transistor from being in a high impedance floating state, by controlling the turn-on and turn-off of the fifth MOS transistor, thereby ensuring the performance of the power glitch signal detection circuit.

In some possible implementation manners, the power glitch signal detection circuit further comprises:
    a first inverter, wherein the drain terminal of the first MOS transistor is connected to the gate terminal of the first MOS transistor through the first inverter.

It can be ensured that the voltage of the drain terminal of the first MOS transistor is "0" by controlling the first inverter, thereby ensuring the performance of the power glitch signal detection circuit. In addition, through the first inverter, current leakage of the capacitor can also be avoided, thereby ensuring that the voltage value of the capacitor remains at the power supply voltage. Thus, the power glitch signal detection circuit can detect, in real time, whether the power supply voltage or the ground voltage is attacked by a power glitch.

In addition, the first MOS transistor, the second MOS transistor, and the inverter may form a latch. Detecting a power glitch on the power supply voltage or the ground voltage based on a latch is different from the traditional RC sampling structure and comparator structure. Specifically, the latch does not need to use a resistor so that the area of the power glitch signal detection circuit and the hardware overhead can be reduced; a positive feedback characteristic of the latch can improve the detection speed of the power glitch signal detection circuit; compared with the resistance-capacitance structure, a negative resistance sluggish characteristic of the latch can detect a glitch signal a with lower amplitude, thereby improving the sensitivity of the power glitch signal detection circuit; the static current of the latch is only the leakage current of the used device, and there is no static bias current, which can reduce static power consumption of the power glitch signal detection circuit; and the latch can be compatible with a digital CMOS process, which can enhance the portability of the glitch signal detection circuit. In short, the power glitch signal detection circuit could detect a power glitch on the power supply voltage or the ground voltage, and the power glitch signal detection circuit has the advantages of low power consumption, small area, high speed, high sensitivity and strong portability.

In some possible implementation manners, the inverter comprises:

a sixth MOS transistor and a seventh MOS transistor, wherein a source terminal of the sixth MOS transistor is connected to the power supply voltage, a gate terminal of the sixth MOS transistor is connected to a gate terminal of the seventh MOS transistor, a drain terminal of the sixth MOS transistor is connected to a drain terminal of the seventh MOS transistor, a source terminal of the seventh MOS transistor is connected to the ground voltage, and the drain terminal of the sixth MOS transistor is connected to the gate terminal of the first MOS transistor.

In some possible implementation manners, the signal output module is a D trigger.

In some possible implementation manners, the power glitch signal detection circuit further comprises:

a threshold decision module, wherein the drain terminal of the second MOS transistor is connected to the signal output module through the threshold module, and the threshold decision module is configured to amplify a signal outputted by the drain terminal of the second MOS transistor and to transmit the amplified signal to the signal output module.

A lower amplitude glitch can be detected by the threshold decision module, which can further increase the sensitivity of the power glitch signal detection circuit.

In some possible implementation manners, the threshold decision module further comprises:

an eighth MOS transistor, a ninth MOS transistor, a tenth MOS transistor, and an eleventh MOS transistor, wherein a source terminal of the eighth MOS transistor is connected to the power supply voltage, a gate terminal of the eighth MOS transistor is connected to a gate terminal of the tenth MOS transistor, a drain terminal of the eighth MOS transistor is connected to a drain terminal of the tenth MOS transistor, a source terminal of the tenth MOS transistor is connected to the ground voltage, a source terminal of the ninth MOS transistor is connected to the power supply voltage, a gate terminal of the ninth MOS transistor is connected to a gate terminal of the eleventh MOS transistor, a drain terminal of the ninth MOS transistor is connected to a drain of the eleventh MOS transistor, a source terminal of the eleventh MOS terminal is connected to the ground voltage, a drain terminal of the eighth MOS transistor is connected to a gate terminal of the ninth MOS transistor, a gate terminal of the eighth MOS transistor is connected to the drain terminal of the second MOS transistor, and a drain terminal of the ninth MOS transistor is connected to the signal output module.

In some possible implementation manners, a width to length ratio of the eighth MOS transistor is less than a first preset threshold, a width to length ratio of the ninth MOS transistor is greater than a second preset threshold, a width of length ratio of the tenth MOS transistor is greater than a third preset threshold, and a width to length ratio of the eleventh MOS transistor is less than a fourth preset threshold, wherein the first preset threshold is less or equal to the third preset threshold and the second preset threshold is greater or equal to the fourth preset threshold.

In some possible implementation manners, the eight MOS transistor and the tenth MOS transistor form a second inverter, and the ninth MOS transistor and the eleventh MOS transistor form a third inverter, wherein an inverting threshold of the second inverter is less than that of the third inverter. For example, the inverting threshold of the second inverter is 0.3, and the inverting threshold of the third inverter is 0.8, that is, reducing the inverting threshold of the second inverter to increase the sensitivity of the power glitch signal detection circuit 100, further, amplifying the inverting threshold of the third inverter to ensure the stability of the power glitch signal detection circuit 100.

In a second aspect, a security chip is provided, comprising:

the power glitch signal detection circuit in the first aspect or any possible implementation manners of the first aspect.

In a third aspect, an electronic apparatus is provided, comprising:

the security chip according to the second aspect; and
a processor, wherein the processor is configured to receive a target signal outputted by the security ship, and the target signal is used to indicate whether there is a power glitch signal on the power supply voltage or the ground voltage.

DESCRIPTION OF EMBODIMENTS

Technical solutions of embodiments of the present disclosure is hereinafter described with reference to the accompanying drawings.

A power glitch attack affects certain circuit units of a chip by quickly changing a power supply voltage (or a ground voltage) inputted to the chip, which causes one or more circuit units to enter an error state, then makes a processor in the chip skip an operation or perform a wrong operation according to the error state, and further exposes hidden security information in the chip.

Figure 1:
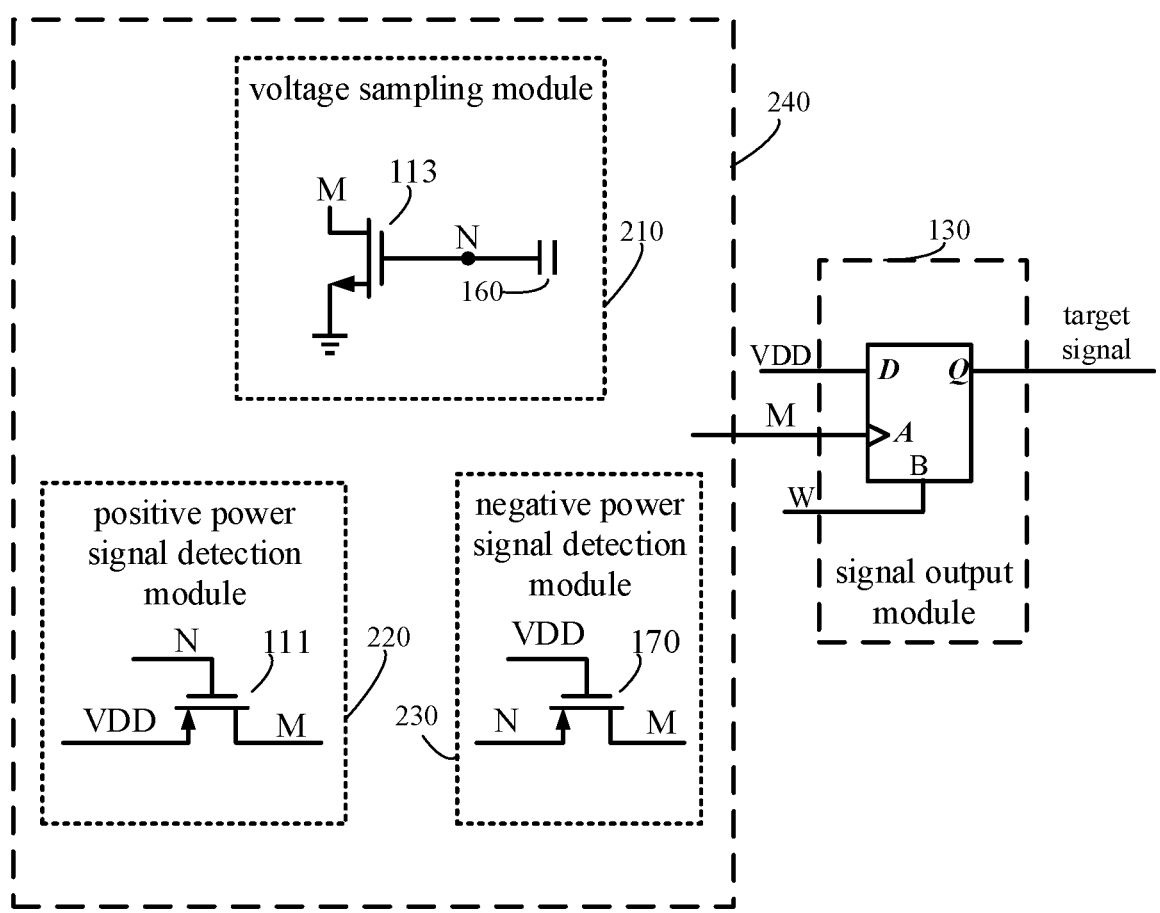
FIG. 1 to FIG. 3 are schematic circuit diagrams of a power glitch signal detection circuit of an embodiment of the present disclosure.

FIG. 1 is a schematic circuit diagram of a power glitch signal detection circuit of an embodiment of the present disclosure;

With reference to FIG. 1, the power glitch signal detection circuit 100 may include a voltage sampling module 210. The voltage sampling module 130 may include a first metal oxide semiconductor (MOS) transistor 113 and a capacitor 160 for sampling a voltage of the power supply voltage, wherein a gate terminal of the first MOS transistor 113 is connected to the capacitor 160, a source terminal of the first MOS transistor 113 is connected to a ground voltage. When there is no power glitch signal on the power supply voltage and no power glitch signal on the ground voltage, a voltage value of the drain terminal of the first MOS transistor equals to the ground voltage, and a voltage value of the gate terminal of the first MOS transistor equals to the power supply voltage sampled by the capacitor.

That is, a power supply voltage sampled by the capacitor 160 that is not affected by the power glitch signal may be obtained with the gate terminal of the first MOS transistor 113 being connected to the capacitor 160; the voltage of the drain terminal of the first MOS transistor 113 can be reset to prevent the drain terminal of the first MOS transistor 113 from being in a high-impedance floating state, with the first MOS transistor 113 being connected to the ground voltage, thereby when there is no power glitch signal on the power supply voltage and no power glitch signal on the ground voltage, the voltage value of the drain terminal of the first MOS transistor 113 is the ground voltage, the voltage value of the gate terminal of the first MOS transistor is the power supply voltage sampled by the capacitor.

Among them, a power signal may be a regular or irregular pulse signal or spike signal of an input waveform in a circuit. For example, a voltage value when there is a positive power glitch signal on a power supply voltage equals to a voltage value when there is no positive power glitch signal on the power supply voltage plus a voltage value of the power glitch signal. Again, for example, a voltage value when there is a negative power glitch signal on a power supply voltage equals to a voltage value when there is no power glitch signal on the power supply voltage minus a voltage value of the power glitch signal.

Similarly, a positive power glitch signal and a negative power glitch signal may also occur on a ground voltage.

As for an unstable power supply voltage, it can also be considered as a voltage of a stable power supply voltage plus a power glitch signal; as for an unstable ground voltage, it can also be considered as a voltage of a stable ground voltage plus a power glitch signal.

With continued reference to FIG. 1, the power glitch signal detection circuit 100 further comprises a positive power glitch signal detection module 220. For example, the positive power glitch signal detection circuit 220 comprises a second MOS transistor 111 and a signal output module 130, wherein a terminal of the second MOS transistor 111 is connected to the gate terminal of the first MOS transistor 113, another terminal of the second MOS transistor 111 is connected to the power supply voltage, and a drain terminal of the second MOS transistor 111 is connected to the drain terminal of the first MOS transistor 113. The signal output module 130 is configured to generate and output a target signal according to change of the voltage value of the drain terminal of the second MOS transistor 111, and the target signal is used to indicate whether there is a power glitch signal on the power supply voltage or the ground voltage.

It is equivalent that the working state of the second MOS transistor 111 is controlled by the power glitch signal with a terminal of the second MOS transistor 111 being connected to the gate terminal of the first MOS transistor 113 and another terminal of the second MOS transistor 111 being connected to the power supply voltage, thereby the signal output module 130 can generate and output the target signal according to change of the voltage value of the drain terminal of the second MOS transistor 111.

For example, when there is no power glitch signal on the power supply voltage and no power glitch signal on the ground voltage, then the voltage value of the drain terminal of the second MOS transistor 111 does not change, and the signal output module 130 is configured to generate and output a first signal, and the first signal is used to indicate that there is no power glitch signal on the power supply voltage or the ground voltage. When there is a power glitch signal on the power supply voltage and/or a power glitch signal on the ground voltage, then the voltage value of the drain terminal of the second MOS transistor 111 changes, and the signal output module 130 is configured to generate and output a second signal, and the second signal is used to indicate that there is a power glitch signal on the power supply voltage or the ground voltage.

In addition, the voltage of the drain terminal of the second MOS transistor 111 can be reset to prevent the drain terminal of the second MOS transistor 111 from being in a high-impedance floating state with the drain terminal of the second MOS transistor 111 being connected to the drain terminal of the first MOS transistor 113, thereby when there is no power glitch signal on the power supply voltage and no power glitch signal on the ground voltage, the voltage value of the drain terminal of the second MOS transistor 111 is the ground voltage.

Sampling a voltage of the power supply voltage based on the capacitor is different from the traditional RC sampling structure. Specifically, sampling a power supply voltage based on the capacitor does not need to use a resistor, thereby the area and hardware overhead of the power glitch signal detection circuit can be reduced. Besides, with the working state of the second MOS transistor 111 being controlled by the power glitch signal, detecting the voltage of the drain terminal of the second MOS transistor 111 though the signal output module 130, can effectively improve detection speed and sensitivity. The static current of the power glitch signal detection circuit 100 is only the leakage current of the used device, and there is no static bias current, which can reduce static power consumption of the power glitch signal detection circuit. In addition, the power glitch signal detection circuit can be compatible with a digital CMOS process, which can enhance the portability of the glitch signal detection circuit.

In short, the power glitch signal detection circuit 100 could detect a power glitch on the power supply voltage or the ground voltage, and the power glitch signal detection circuit has the advantages of low power consumption, small area, high speed, high sensitivity and strong portability.

With continued reference to FIG. 1, the gate terminal of the second MOS transistor 111 is connected to the gate terminal of the first MOS transistor 113, and the source terminal of the second MOS transistor 111 is connected to the power supply voltage.

For example, when there is no positive power glitch signal on the power supply voltage and no negative power glitch signal on the ground voltage, then the voltage value of the drain terminal of the second MOS transistor 111 does not change, the signal output module 130 is configured to generate and output a first signal, and the first signal is used to indicate that there is no power glitch signal on the power supply voltage or the ground voltage; when there is a positive power glitch signal on the power supply voltage and/or a negative power glitch signal on the ground voltage, then the voltage value of the drain terminal of the second MOS transistor 111 changes, the signal output module 130 is configured to generate and output a second signal, and the second signal is used to indicate that there is a power glitch signal on the power supply voltage or the ground voltage.

For example, when there is a positive power glitch signal on the power supply voltage, a voltage of the source terminal of the second MOS transistor 111 increases and a voltage of the gate terminal does not change, thereby leading to increase of the voltage of the drain terminal. When there is a negative power glitch signal on the ground voltage, because of the capacitor coupling, the voltage of the gate terminal of the second MOS transistor 111 decreases, and the voltage of the source terminal does not change, thereby leading to increase of the voltage of the drain terminal of the second MOS transistor 111.

It is equivalent that the working state of the second MOS transistor 111 is controlled by a glitch signal, that is, the signal output module 130 can generate and output the target signal according to change of the voltage value of the drain terminal of the second MOS transistor 111.

That is, the power glitch signal detection circuit 100 can detect whether there is a positive power glitch signal on the power supply voltage and whether there is a negative power glitch signal on the ground voltage, through the second MOS transistor 111.

With continued reference to FIG. 1, the power glitch signal detection circuit 100 further comprises a negative power glitch signal detection module 230. For example, the negative power glitch signal detection module 230 can be a third MOS transistor 170, wherein the gate terminal of the third MOS transistor 170 is connected to the power supply voltage, the source terminal of the third MOS transistor 170 is connected to the gate terminal of the second MOS transistor 111, and the drain terminal of the third MOS transistor 170 is connected to the drain terminal of the first MOS transistor 113.

For example, when there is no negative power glitch signal on the power supply voltage and no positive power glitch signal on the ground voltage, then the voltage value of the drain terminal of the third MOS transistor 170 does not change, and the signal output module 130 is configured to generate and output a third signal, and the third signal is used to indicate that there is no power glitch signal on the power supply voltage or the ground voltage; when there is a negative power glitch signal on the power supply voltage and/or a positive power glitch signal on the ground voltage, then the voltage value of the drain terminal of the third MOS transistor 170 changes, and the signal output module 130 is configured to generate and output a fourth signal, and the fourth signal is used to indicate that there is a power glitch signal on the power supply voltage or the ground voltage.

For example, when there is a negative power glitch signal on the power supply voltage, a voltage of the source terminal does not change, and because of decrease of a voltage of the gate terminal, the voltage of the drain terminal increases. When there is a positive power glitch signal on the ground voltage, the voltage of the gate terminal of the third MOS transistor 170 does not change, and because of increase of the voltage of the source terminal due to the capacitive coupling, the voltage of the drain terminal of the third MOS transistor increases. It is equivalent that the working state of the third MOS transistor 170 is controlled by a power signal. Thus, the signal output module is configured to generate and output the target signal according to change of the voltage value of the drain terminal of the third MOS transistor 170.

That is, the power glitch signal detection circuit 100 can detect whether there is a positive power glitch signal on the power supply voltage and whether there is a negative power glitch signal on the ground voltage, through the second MOS transistor 111. Further, it can be detected that whether there is a negative power glitch signal on the power supply voltage and whether there is a positive power glitch signal on the ground voltage, through the second MOS transistor 170. In other words, the second MOS transistor 111 and the third MOS transistor 170 can form a bidirectional detection module 240, which could implement a bidirectional power glitch signal detection. For example, a detection of a positive and a negative power glitch signals on the power supply voltage can be implemented; and again for example, a detection of a positive and a negative power glitch signals on the ground voltage can be implemented.

It should be understood that, in some embodiments, the power glitch detection circuit may also only include the voltage sampling module 210, the third MOS transistor 170 and the signal output module 130, which are configured to only detect whether there is a negative power glitch signal on the power supply voltage and whether there is a positive power glitch signal on the ground voltage.

Figure 2:
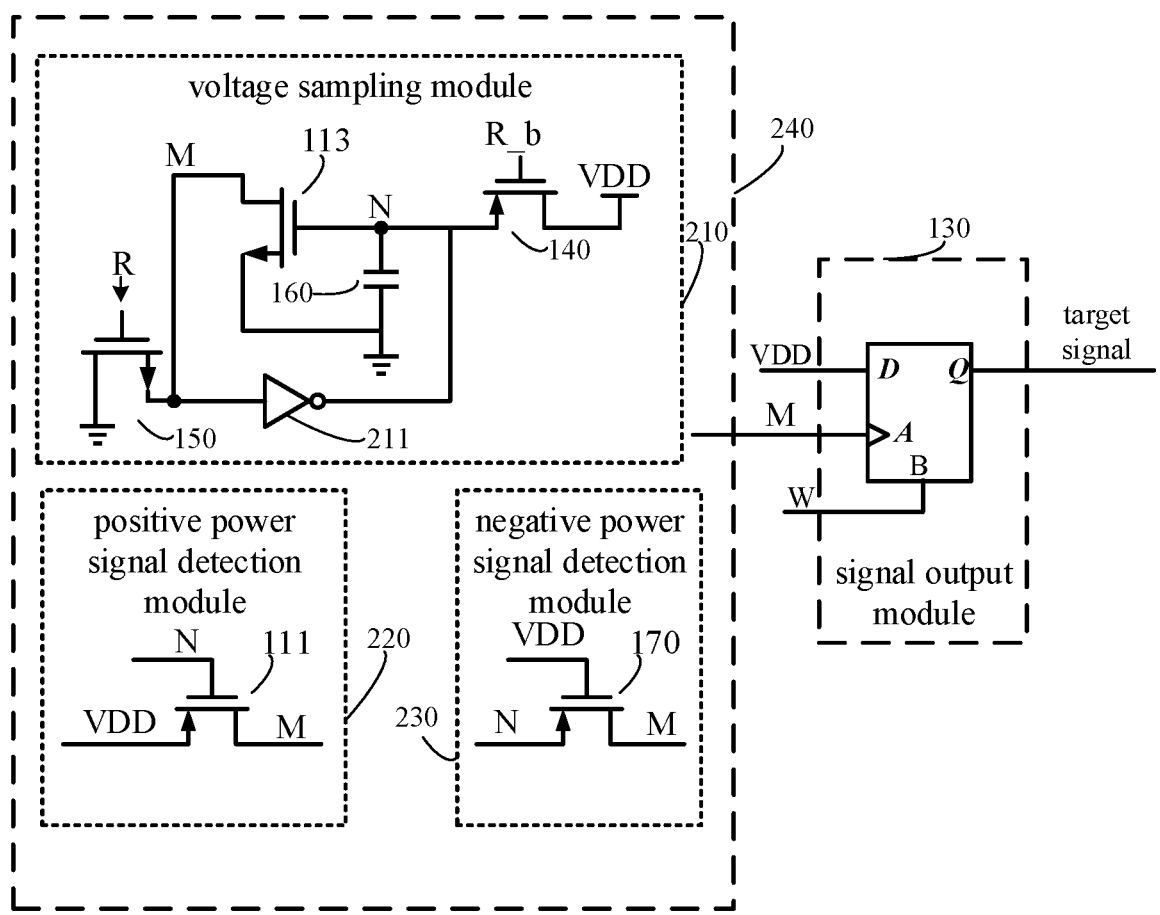

FIG. 2 is a schematic diagram of a variant circuit of the power glitch signal detection circuit 100 shown in FIG. 1.

With reference to FIG. 2, the power glitch signal detection circuit 100 may further comprise a fourth MOS transistor 140, wherein a terminal of the capacitor 160 connected to the gate terminal of the first MOS transistor 113 is connected to the power supply voltage through the fourth MOS transistor 140, and another terminal of the capacitor 160 is connected to the ground voltage.

The capacitor can be configured to sample the power supply voltage, by controlling the turn-on and turn-off of the fourth MOS transistor 140. For example, when the gate terminal of the fourth MOS transistor 140 receives a low level control signal, the fourth MOS transistor 140 is turned on, and charges the capacitor 160 through the power supply voltage. When the voltage of the capacitor 160 reaches the power supply voltage, the gate terminal of the fourth MOS transistor 140 receives a high level control signal, and the fourth MOS transistor 140 is turned off, thereby the voltage of the capacitor 160 is maintained at the power supply voltage.

With continued reference to FIG. 2, the power glitch signal detection circuit 100 may also comprise a fifth MOS transistor 150, wherein the gate terminal of the first MOS transistor 113 is connected to the ground voltage through the fifth MOS transistor 150.

By controlling the turn-on and turn-off of the fifth MOS transistor 150, the voltage of the drain terminal of the first MOS transistor 113 can be reset to prevent the drain terminal of the first MOS transistor 113 from being in a high impedance floating state, thereby ensuring the performance of the signal detection circuit 100.

In some embodiments, a control signal used to control the fourth MOS transistor 140 and a control signal used to control the fifth MOS transistor 150 can be a set of inverted signals.

For example, the gate terminal of the fifth MOS transistor 150 is used to receive a first signal R and the gate terminal of the fourth MOS transistor 140 is used to receive an inverted signal R_b of the first signal R.

For example, when the first signal R is at a high level, the fourth MOS transistor 140 and the fifth MOS transistor 150 are both turned on, and the power supply voltage charges the capacitor 160 through the fourth MOS transistor 140 so that the first voltage of the gate terminal N of the first MOS transistor 113 is "1", and the drain terminal M of the first MOS transistor 113 is connected to the ground through the fifth MOS transistor 150, thereby the second voltage of the drain terminal M of the first MOS transistor 113 is made to be "0". Then, when the first signal R is at a low level, the fourth MOS transistor 140 and the fifth MOS transistor 150 are both turned off, thereby the first voltage of the gate terminal N of the first MOS transistor 113 is maintained at "1" and the second voltage of the drain terminal M of the first MOS transistor 113 is maintained at "0".

That is, the voltage of the gate terminal N of the first MOS transistor 113 can be increased to VDD and the voltage of the drain terminal M of the first MOS transistor 113 can be decreased to GND, through the control signal.

With continued reference to FIG. 2, the power glitch signal detection circuit 100 may also comprise a first inverter 211, wherein the drain terminal of the first MOS transistor 113 is connected to the ground voltage through the first inverter 211.

By controlling the first inverter 211, it can be ensured that the voltage of the drain terminal of the first MOS transistor 113 is at "0", thereby ensuring the performance of the power glitch signal detection circuit 100. Even if the voltage of the drain terminal of the first MOS transistor 113 increases, the first inverter 211 can ensure that the voltage of the drain terminal of the first MOS transistor 113 is restored to "0". In addition, through the first inverter, current leakage of the capacitor 160 can also be avoided, thereby ensure that the voltage value of the capacitor remains at the power supply voltage. Thus, the power glitch signal detection circuit can detect, in real time, whether the power supply voltage or the ground voltage is attacked by a power glitch.

Figure 3:
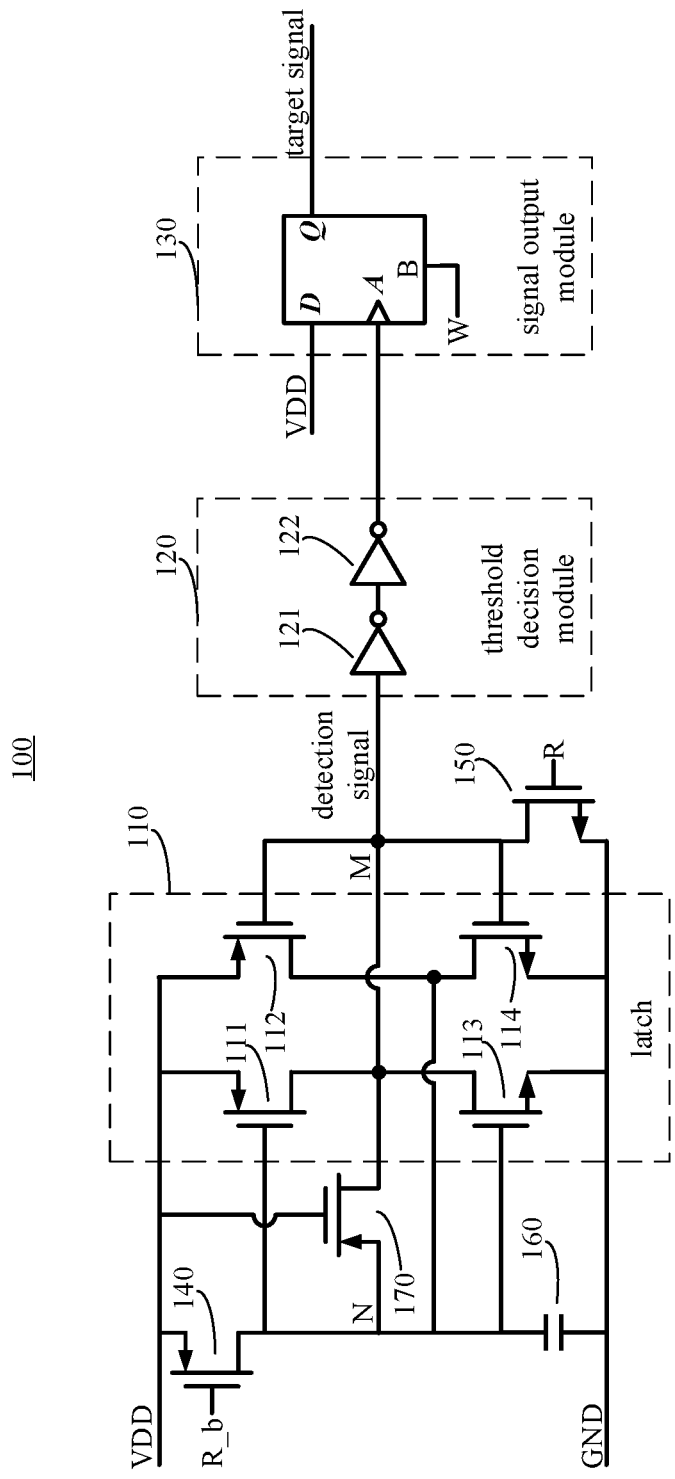

FIG. 3 is another schematic diagram of the circuit structure of FIG. 2.

With reference to FIG. 3, the first inverter may include a sixth MOS transistor 112 and a seventh MOS transistor 114, wherein the source terminal of the sixth MOS transistor 112 is connected to the power supply voltage, the gate terminal of the sixth MOS transistor 112 is connected to the gate terminal of the seventh MOS transistor 114, the drain terminal of the sixth MOS transistor 112 is connected to the drain terminal of the seventh MOS transistor 114, the source terminal of the seventh MOS transistor 114 is connected to the ground voltage, and the drain terminal of the sixth MOS transistor 112 is connected to the gate terminal of the first MOS transistor 113.

In other words, the power glitch signal detection circuit 100 may include a latch 110, wherein the latch 110 may include a second MOS transistor 111, a first MOS transistor 113, a sixth MOS transistor 112 and a seventh MOS transistor 114; the source terminal of the second MOS transistor 111 is connected to the power supply voltage, the gate terminal of the second MOS transistor 111 is connected to the gate terminal of the sixth MOS transistor 112, the drain terminal of the second MOS transistor 111 is connected to the drain terminal of the sixth MOS transistor 112, the source terminal of the sixth MOS transistor 112 is connected to the ground voltage, the source terminal of the first MOS transistor 113 is connected to the power supply voltage, the gate terminal of the first MOS transistor 113 is connected to the gate terminal of the seventh MOS transistor 114, the drain terminal of the first MOS transistor 113 is connected to the drain terminal of the seventh MOS transistor 114, the source terminal of the seventh MOS transistor 114 is connected to the ground voltage, the gate terminal of the second MOS transistor 111 is connected to the drain terminal of the first MOS transistor 113, and the gate terminal of the first MOS transistor 113 is connected to the drain terminal of the second MOS transistor 111.

Detecting a power glitch on the power supply voltage or the ground voltage based on a latch is different from the traditional RC sampling structure and comparator structure. Specifically, the latch does not need to use a resistor so that the area of the power glitch signal detection circuit and the hardware overhead can be reduced. The positive feedback characteristic of the latch can improve the detection speed of the power glitch signal detection circuit; compared with a resistance-capacitance structure, negative resistance sluggish characteristic of the latch can detect a glitch signal with a lower amplitude, thereby improving the sensitivity of the power glitch signal detection circuit. The static current of the latch is only the leakage current of the used device, and there is no static bias current, which can reduce static power consumption of the power glitch signal detection circuit; and the latch can be compatible with a digital CMOS process, which can enhance the portability of the glitch signal detection circuit. In short, the power glitch signal detection circuit could detect a power glitch on the power supply voltage or the ground voltage, and the power glitch signal detection circuit has the advantages of low power consumption, small area, high speed, high sensitivity and strong portability.

With continued reference to FIG. 3, the signal output module 130 may be a D trigger.

Then, a reset terminal B of the D trigger is connected to a reset signal W, for example, the reset signal W may be the first signal R; wherein a terminal D of the D trigger is connected to the VDD; and a detecting terminal A of the D trigger is connected to the drain terminal of the first MOS transistor 113, which is configured to receive a detection signal, and a output terminal Q of the D trigger is configured to output a target signal (which is an alarm signal). Of course, the signal output module 130 may also be other devices, such as a comparator.

With reference to FIG. 3, the power glitch signal detection circuit 100 further includes a threshold decision module 120, wherein the drain terminal of the first MOS transistor 113 is connected to the signal output module 130 through the threshold module 120, and the threshold decision module 120 is configured to amplify a signal outputted by the drain terminal of the first MOS transistor 113 and to transmit the amplified signal to the signal output module 130.

A lower amplitude power glitch can be detected in cooperation with the threshold decision module 120, which can further increase the sensitivity of the power glitch signal circuit 100.

Operating principle of the power glitch signal detection circuit 100 is hereinafter described in details with the accompanying drawings.

When there is no power glitch signal on VDD and GND, through the action of the latch 110, the gate terminal N of the first MOS transistor 113 is increased by the fourth MOS transistor 140 and maintained at "1", and the drain terminal M of the first MOS transistor 113 is decreased by the third MOS transistor 150 and maintained at "0".

Then, static power consumption of the power glitch signal detection circuit 100 is only leakage power consumption of the used device.

When there is a positive glitch on the VDD and the amplitude of the glitch is larger than the threshold voltage of the second MOS transistor 111, wherein the target signal outputted by the signal output module 130 is used to indicate there is a glitch on the power supply voltage or the ground voltage.

With reference to FIG. 3, the voltage of the gate terminal of the second MOS transistor 111 (which is the gate terminal N of the first MOS transistor 113) is maintained unchanged, then the voltage of the source terminal of the second MOS transistor 111 increases. When the amplitude of the glitch is larger than the threshold voltage of the second MOS transistor 111, the second MOS transistor is turned on, and then starts to charge the drain terminal M of the first MOS transistor 113 to increase its voltage. The latch 110 triggers the voltage of the gate terminal N of the first MOS transistor decreasing to "0", and the voltage of the drain terminal M of the first MOS transistor 113 further increasing to "1", then a detection signal outputted by the threshold decision module 120 is increased to "1". After the signal output module 130 detecting a rising edge of the detection signal, then the output state of the D trigger is updated, that is, the target signal outputted by the signal output module 130 is changed to "1", which is used to indicate that there is a glitch on the power supply voltage or the ground voltage.

When there is a positive glitch on the VDD and the amplitude of the glitch is close to the threshold voltage of the second MOS transistor 111, then the target signal outputted by the signal output module 130 is used to indicate there is a glitch on the power supply voltage or the ground voltage.

Figure 4:
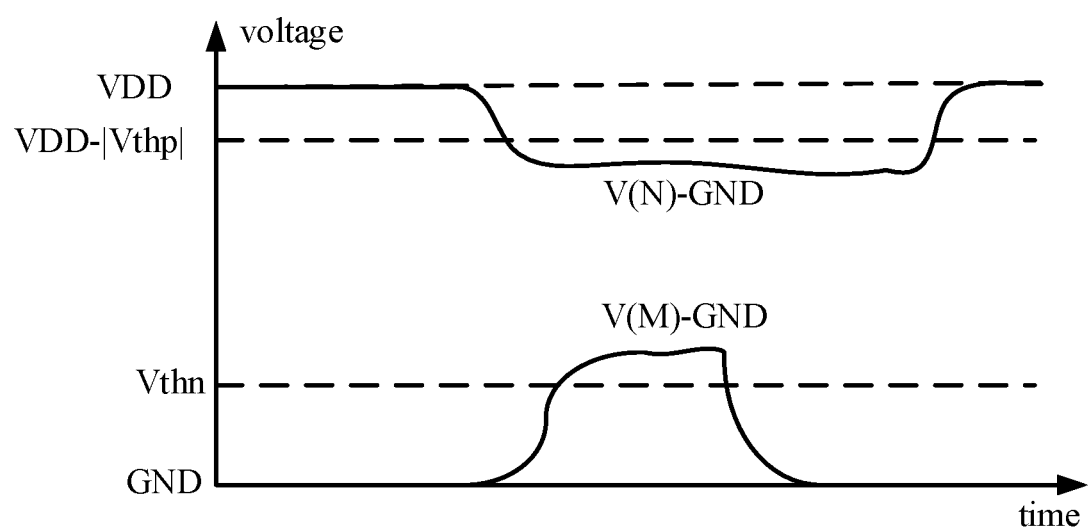
FIG. 4 is a schematic diagram of voltage states of a gate terminal N of a first MOS transistor and a drain terminal M of the first MOS transistor of a voltage sampling module of an embodiment of the present disclosure.

With reference to FIG. 3, the voltage of the gate terminal of the second MOS transistor 111 (which is the gate terminal N of the first MOS transistor 113) is maintained unchanged, then the voltage of the source terminal increases. When the amplitude of the glitch is close to the threshold voltage of the second MOS transistor 111, VDD charges the drain terminal M of the first MOS transistor 113 through the leakage voltage of the second MOS transistor 111 to increase its voltage and discharges the gate terminal N of the first MOS transistor 113 through the seventh MOS transistor 114 to decrease its voltage. Since the increase of the voltage of the drain terminal M of the first MOS transistor 113 leads to decrease of the current passing through the second MOS transistor 111, that is, the voltage of the drain terminal M of the first MOS transistor 113 stops further increasing and the voltage of the gate terminal N of the first MOS transistor stops further decreasing. Through the action of the latch 110, the voltage of the drain terminal M of the first MOS transistor 113 will decrease to "0" over time and the voltage of the gate terminal N of the first MOS transistor 113 will increase to "1" over time. For example, states of voltages of point N and point M can be illustrated as in FIG. 4; the threshold decision module 120 can detect that the voltage of the drain terminal M of the first MOS transistor 113 is maintaining an increasing state in a period of time and determine the state to be "1", that is, a detection signal outputted is increased to "1". For example, the threshold decision module 120 detect a maximum difference V(M)−GND between the voltage of the drain terminal M of the first MOS transistor V(M) and the ground voltage GND is larger or equal to a first threshold voltage Vthn of the threshold decision module 120, then the threshold decision module 120 occurs a signal inversion (from 0 to 1). The D trigger detects a rising edge of the detection signal, then the output state of the D trigger is updated, and then target signal outputted by the signal output module 130 is changed to "1", which is used to indicate that there is a glitch on the power supply voltage or the ground voltage.

It should be understood that, FIG. 3 is only an exemplary embodiment of the present disclosure, and to which the present disclosure shall not be limited.

For example, if the threshold decision module 120 is connected to the gate terminal N of the first MOS transistor 113 of the latch 110, at this time, the threshold decision module 120 detects that the voltage of the gate terminal N of the first MOS transistor 113 is maintaining a decreasing state in a period of time, then determines the state to be "1", that is, a detection signal outputted is increased to "1". For example, the threshold decision module 120 detects a difference between the voltage of the gate terminal N of the first MOS transistor 113 V(N) and the ground voltage GND is less or equal to a difference VDD−|Vthp| between the power supply voltage and a second threshold voltage Vthp of the threshold decision module 120, then the threshold decision module 120 occurs a signal inversion (from 0 to 1). The D trigger of the signal output module 130 detects a failing edge of the detection signal, then the output state of the D trigger is updated, and the target signal outputted by the signal output module 130 is changed to "1", which is used to indicate that there is a glitch on the power supply voltage or the ground voltage.

When there is a negative glitch on the GND and the amplitude of the glitch is larger than the threshold voltage of the second MOS transistor 111, the target signal outputted by the signal output module 130 is used to indicate there is a glitch on the power supply voltage or the ground voltage.

With reference to FIG. 3, capacitive coupling causes a decrease of the voltage of the gate terminal of the second MOS transistor 111 and the voltage of the source terminal of the second MOS transistor 111 is maintained unchanged. When the amplitude of the glitch is larger than the threshold voltage of the second MOS transistor 111, the second MOS transistor 111 is turned on, then starts to charge the drain terminal M of the first MOS transistor 113 to increase its voltage, and the voltage of the gate terminal N of the first MOS transistor 113 is decreased by the latch 110, the voltage of the drain terminal M of the first MOS transistor 113 further increased to "1". At this time, a detection signal outputted by the threshold decision module 120 is increased to "1", after the signal output module 130 detecting a rising edge of the detection signal, the output state of the D trigger is updated, that is, the target signal outputted by the signal output module 130 is changed to "1", which is used to indicate that there is a glitch on the power supply voltage or the ground voltage.

When there is a negative glitch on the GND and the amplitude of the glitch is close to the threshold voltage of the second MOS transistor 111, then the target signal outputted by the signal output module 130 is used to indicate there is a glitch on the power supply voltage or the ground voltage.

With reference to FIG. 3, capacitive coupling causes a decrease of the voltage of the gate terminal of the second MOS transistor 111 and the voltage of the source terminal of the second MOS transistor 111 is maintained unchanged. When the amplitude of the glitch is close to the threshold voltage of the second MOS transistor 111, the power supply voltage charges the drain terminal M of the first MOS transistor 113 though the second MOS transistor 111 to increase its voltage and discharges the gate terminal N of the first MOS transistor 113 through the seventh MOS transistor 114 to decrease its voltage. Increase of the voltage of the drain terminal M of the first MOS transistor 113 leads to decrease of the current passing through the second MOS transistor 111, that is, the voltage of the drain terminal M of the first MOS transistor 113 stops further increasing and the voltage of the gate terminal N of the first MOS transistor stops further decreasing. Through the action of the latch 110, the voltage of the drain terminal M of the first MOS transistor 113 will decrease to "0" over time and the voltage of the second input N will increase to "1" over time. Specifically, states of voltages of point N and point M can be illustrated as in FIG. 4. The threshold decision module 120 can detect that the voltage of the drain terminal M of the first MOS transistor 113 is maintaining an increasing state in a period of time and determine the state to be "1", that is, the detection signal outputted is increased to "1". The D trigger detects a rising edge of the detection signal, then the output state of the D trigger is updated, and then target signal outputted by the signal output module 130 is changed to "1", which is used to indicate that there is a glitch on the power supply voltage or the ground voltage.

Operating principle of the third MOS transistor 170 is hereinafter described with the FIG. 3.

When there is a negative glitch signal on the VDD and the amplitude of the glitch is greater than the threshold voltage of the third MOS transistor 170, and the target signal outputted by the signal output module 130 is used to indicate there is a glitch on the power supply voltage or the ground voltage.

With reference to FIG. 3, the voltage of the source terminal of the third MOS transistor 170 (which is the gate terminal N of the first MOS transistor 113) is maintained unchanged, then the voltage of the gate terminal of the second MOS transistor 170 decreases. When the amplitude of the glitch is larger than the threshold voltage of the third MOS transistor 170, the third MOS transistor 170 is turned on. The capacitor 160 charges the drain terminal M of the first MOS transistor 113 through the fifth MOS transistor 170 to increase its voltage, at the same time, after charge distribution, the voltage of the gate terminal N of the first MOS transistor 113 decreases. The latch 110 further decreases the voltage of the gate terminal N of the first MOS transistor 113 to "0", and further increases the voltage of the drain terminal M of the first MOS transistor 113 to "1". At this time, a detection signal outputted by the threshold decision module 120 is increased to "1", after the signal output module 130 detecting a rising edge of the detection signal, the output state of the D trigger is updated, that is, the target signal outputted by the signal output module 130 is changed to "1", which is used to indicate that there is a glitch on the power supply voltage or the ground voltage.

When there is a negative glitch signal on the VDD and the amplitude of the glitch is close to the threshold voltage of the third MOS transistor 170, and the target signal outputted by the signal output module 130 is used to indicate there is a glitch on the power supply voltage or the ground voltage.

With reference to FIG. 3, the voltage of the source terminal of the third MOS transistor 170 (which is the gate terminal N of the first MOS transistor 113) is maintained unchanged and the voltage of the gate terminal of the third MOS transistor 170 decreases. When the amplitude of the glitch is close to the threshold voltage of the third MOS transistor 170, the third MOS transistor 170 is turned on. Wherein the capacitor 160 charges the drain terminal M of the first MOS transistor 113 through the third MOS transistor 170 to increase its voltage, at the same time, after charge distribution, the voltage of the gate terminal N of the first MOS transistor 113 decreases. Increase of the voltage of the drain terminal M of the first MOS transistor 113 leads to decrease of the current passing through the third MOS transistor 170, that is, the voltage of the drain terminal M of the first MOS transistor 113 stops further increasing and the voltage of the gate terminal N of the first MOS transistor 113 stops further decreasing. Through the action of the latch 110, the voltage of the drain terminal M of the first MOS transistor 113 will decrease to "0" over time and the voltage of the gate terminal N of the first MOS transistor 113 will increase to "1" over time. Specifically, states of voltages of point N and point M can be illustrated as in FIG. 4. The threshold decision module 120 can detect that the voltage of the drain terminal M of the first MOS transistor 113 is maintaining an increasing state in a period of time and determine the state to be "1", that is, the detection signal is increased to "1". The D trigger detects a rising edge of the detection signal, then the output state of the D trigger is updated, and then target signal outputted by the signal output module 130 is changed to "1", which is used to indicate that there is a glitch on the power supply voltage or the ground voltage.

When there is a positive glitch on the GND and the amplitude of the glitch is greater than the threshold voltage of the third MOS transistor 170, and the target signal outputted by the signal output module 130 is used to indicate there is a glitch on the power supply voltage or the ground voltage.

With reference to FIG. 3, the voltage of the source terminal of the third MOS transistor 170 (which is the gate terminal N of the first MOS transistor 113) increases, then the voltage of the gate terminal of the second MOS transistor 170 is maintained unchanged. When the amplitude of the glitch is larger than the threshold voltage of the third MOS transistor 170, the third MOS transistor 170 is turned on, the capacitor 160 charges the drain terminal M of the first MOS transistor 113 through the fifth MOS transistor 170 to increase its voltage, at the same time, after charge distribution, the voltage of the gate terminal N of the first MOS transistor 113 decreases. The latch 110 further decreases the voltage of the gate terminal N of the first MOS transistor 113 to "0", and further increases the voltage of the drain terminal M of the first MOS transistor 113 to "1". At this time, a detection signal outputted by the threshold decision module 120 is increased to "1", after the signal output module 130 detecting a rising edge of the detection signal, the output state of the D trigger is updated, that is, the target signal outputted by the signal output module 130 is changed to "1", which is used to indicate that there is a glitch on the power supply voltage or the ground voltage.

When there is a negative glitch signal on the VDD and the amplitude of the glitch is close to the threshold voltage of the third MOS transistor 170, and the target signal outputted by the signal output module 130 is used to indicate there is a glitch on the power supply voltage or the ground voltage.

With reference to FIG. 3, the voltage of the source terminal of the third MOS transistor 170 (which is the gate terminal N of the first MOS transistor 113) increases, and the voltage of the gate terminal of the third MOS transistor 170 is maintained unchanged. When the amplitude of the glitch is close to the threshold voltage of the third MOS transistor 170, the capacitor 160 charges the point M through the fifth MOS transistor 170 to increase its voltage, at the same time, after charge distribution, the voltage of the point N decreases. When the amplitude of the glitch is close to the threshold voltage of the third MOS transistor 170, the third MOS transistor 170 is turned on, the capacitor 160 charges the drain terminal M of the first MOS transistor 113 through the third MOS transistor 170 to increase its voltage, at the same time, after charge distribution, the voltage of the gate terminal N of the first MOS transistor 113 decreases. Increase of the voltage of the drain terminal M of the first MOS transistor 113 leads to decrease of the current passing through the third MOS transistor 170, that is, the voltage of the drain terminal M of the first MOS transistor 113 stops further increasing and the voltage of the gate terminal N of the first MOS transistor 113 stops further decreasing. Through the action of the latch 110, the voltage of the drain terminal M of the first MOS transistor 113 will decrease to "0" over time and the voltage of the gate terminal N of the first MOS transistor 113 will increase to "1" over time. Specifically, states of voltages of point N and point M can be illustrated as in FIG. 4. The threshold decision module 120 can detect that the voltage of the drain terminal M of the first MOS transistor 113 is maintaining an increasing state in a period of time and determine the state to be "1", that is, the detection signal outputted is increased to "1". The D trigger detects a rising edge of the detection signal, then the output state of the D trigger is updated, and then target signal outputted by the signal output module 130 is changed to "1", which is used to indicate that there is a glitch on the supply voltage or the ground voltage.

Figure 5:
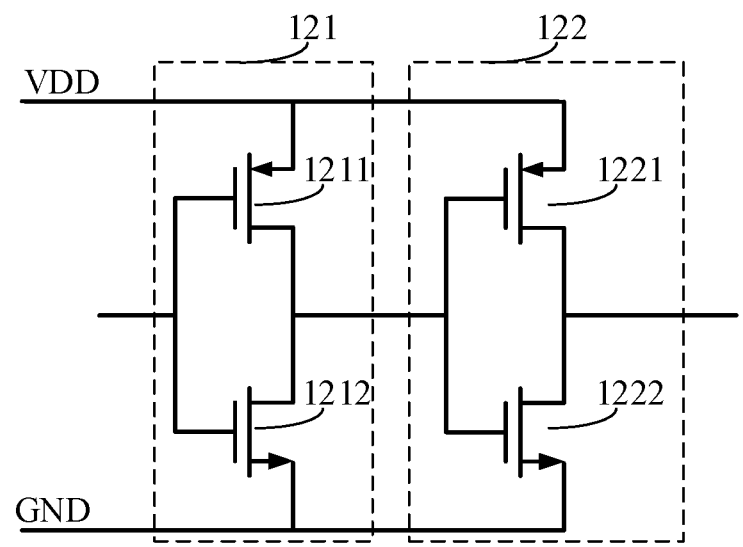
FIG. 5 is a schematic circuit diagram of a threshold decision module of an embodiment of the present disclosure.

FIG. 5 is a schematic circuit diagram of a threshold decision module 120 of an embodiment of the present disclosure;

With reference to FIG. 5, the threshold decision module 120 includes: an eighth MOS transistor 1211, a ninth MOS transistor 1221, a tenth MOS transistor 1212, and a eleventh MOS transistor 1222, wherein a source terminal of the eighth MOS transistor 1211 is connected to the power supply voltage, a gate terminal of the eighth MOS transistor 1211 is connected to a gate terminal of the tenth MOS transistor 1212, a drain terminal of the eighth MOS transistor 1211 is connected to a drain of the tenth MOS transistor 1212, a source terminal of the tenth MOS transistor 1212 is connected to the ground voltage, a source terminal of the ninth MOS transistor 1221 is connected to the power supply voltage, a gate terminal of the ninth MOS transistor 1221 is connected to a gate of the eleventh MOS transistor 1222, a drain terminal of the ninth MOS transistor 1221 is connected to a drain terminal of the eleventh MOS transistor 1222, a source terminal of the eleventh MOS terminal 1222 is connected to the ground voltage, the drain terminal of the eighth MOS transistor 1211 is connected to the gate terminal of the ninth MOS transistor 1221, the gate terminal of the eighth MOS transistor 1211 is connected to the drain terminal of the second MOS transistor 111, and the gate terminal of the ninth MOS transistor 1221 is connected to the signal output module 130.

Optionally, the width to length ratio of the eighth MOS transistor 1211 is less than a first preset threshold, the width to length ratio of the ninth MOS transistor 1221 is greater than a second preset threshold, the width of length ratio of the tenth MOS transistor 1212 is greater than a third preset threshold, the width to length ratio of the eleventh MOS transistor 1222 is less than a fourth preset threshold, wherein, the first preset threshold is less or equal to the third preset threshold and the second preset threshold is greater or equal to the fourth preset threshold, in order to improve the amplification of the threshold decision module 120, thereby improving the sensitivity of the power glitch signal detection circuit 100.

In other words, the eight MOS transistor 1211 and the tenth MOS transistor 1212 form a second inverter, and the ninth MOS transistor 1221 and the eleventh MOS transistor 1222 form a third inverter, wherein an inverting threshold of the second inverter is less than that of the third inverter. For example, the inverting threshold of the second inverter is 0.3, and the inverting threshold of the third inverter is 0.8, that is, reducing the inverting threshold of the second inverter to increase the sensitivity of the power glitch signal detection circuit 100, further, amplifying the inverting threshold of the third inverter to ensure the stability of the power glitch signal detection circuit 100.

It should be understood that 0.3 and 0.8 are only exemplary embodiments, and the inverting threshold of the second inverter and the inverting threshold of the third inverter are not specifically limited in the present disclosure.

The present disclosure also provides an electronic apparatus, wherein the electronic apparatus may include the above-mentioned power glitch signal detection circuit.

It should be understood that the above-mentioned MOS transistor may be a Metal-Oxide-Semiconductor Field-Effect Transistor (MOSFET). Such as N-type MOS transistor (NMOSFET) and P-type MOS transistor (PMOSFET). When N-type MOS transistor and P-type MOS transistor are used as switches, the N-type MOS transistor (a MOS transistor with a substrate PN junction pointing inward or a MOS transistor with a current flowing out) is turned on when the gate terminal is connected to the high voltage, and is turned off when connected to the low voltage; the P-type MOS transistor (a MOS transistor with a PN junction pointing outward or a MOS transistor with a current flowing in) is turned off when the gate terminal is connected to a high voltage and turned on when the gate terminal is connected to a low voltage.

It should also be understood that, FIG. 1 to FIG. 5 are only exemplary embodiments of the present disclosure, and the present disclosure is not limited to such embodiments.

For example, alternatively, the drain terminal of the sixth MOS transistor 112 may also be connected to the signal output module 130.

Those skilled in the art may be aware that the units and circuits of the examples described in combination with the embodiments disclosed herein can be implemented by electronic hardware or a combination of computer software and electronic hardware. Whether these functions are executed by hardware or software depends on the specific application and constraints of design of the technical solution. Professionals can use different methods for each specific application to implement the described functions, but such implementation should not be considered beyond the scope of this application.

In several embodiments provided in the present disclosure, it should be understood that the disclosed circuits, branches, and modules may be implemented in other ways. For example, the branches described above are schematic. For example, the division of the modules is only a division of logical functions, and there may be other divisions in actual implementation. For example, multiple modules can be combined or integrated into one branch, or some features can be ignored or not implemented.

If the integrated module is implemented in the form of a software functional unit and sold or used as an independent product, it can be stored in a computer readable storage medium. Based on such understanding, the technical solution provided by the present essentially or the part that contributes to prior art or the part of the technical solution can be embodied in the form of a software product, and the computer software product is stored in a storage medium, including instructions that can be used to make a computer device (which may be a personal computer, a server, or a network device, etc.) execute all or part of the steps of the method described in each embodiment of the present disclosure. And above-mentioned storage media include: U disk, portable hard disk, Read-Only Memory (ROM), Random Access Memory (RAM), magnetic disk or optical disk and other media that can store program code.

The above description is merely the specific embodiments of the present invention, but the protection scope of the present invention is not limited thereto, any skilled who is familiar with this art could readily conceive variations or substitutions within the disclosed technical scope disclosed by the present invention, and these variations or substitutions shall be encompassed in the protection scope of the present invention. Thus, the protection scope of the present invention shall be subjected to the protection scope of the claims.

What is claimed is:

1. A power glitch signal detection circuit, comprising:
a voltage sampling module, wherein the voltage sampling module includes:
a capacitor for sampling a power supply voltage; and
a first metal oxide semiconductor (MOS) transistor, wherein a gate terminal of the first MOS transistor is connected to the capacitor, a source terminal of the first MOS transistor is connected to a ground voltage, when there is no power glitch signal on the power supply voltage and no power glitch signal on the ground voltage, a voltage value of a drain terminal of the first MOS transistor equals to the ground voltage, and a voltage value of the gate terminal of the first MOS transistor equals to the power supply voltage sampled by the capacitor;
wherein the power glitch signal detection circuit further comprising a second MOS transistor and a signal output module, wherein
a terminal of the second MOS transistor is connected to the gate terminal of the first MOS transistor, another terminal of the second MOS transistor is connected to the power supply voltage, and the drain terminal of the second MOS transistor is connected to a drain terminal of the first MOS transistor;
the signal output module is configured to generate and output a target signal according to change of a voltage value of the drain terminal of the second MOS transistor, and the target signal is used to indicate whether there is a power glitch signal on the power supply voltage or the ground voltage.

2. The power glitch signal detection circuit according to claim 1, wherein a gate terminal of the second MOS transistor is connected to the gate terminal of the first MOS transistor, and a source terminal of the second MOS transistor is connected to the power supply voltage.

3. The power glitch signal detection circuit according to claim 2, wherein when there is no positive power glitch signal on the power supply voltage and no negative power glitch signal on the ground voltage, then the voltage value of the drain terminal of the second MOS transistor does not change, the signal output module is configured to generate and output a first signal, and the first signal is used to indicate that there is no power glitch signal on the power supply voltage or the ground voltage; when there is a positive power glitch signal on the power supply voltage and/or a negative power glitch signal on the ground voltage, then the voltage value of the drain terminal of the second MOS transistor changes, the signal output module is configured to generate and output a second signal, and the second signal is used to indicate that there is a power glitch signal on the power supply voltage or the ground voltage.

4. The power glitch signal detection circuit according to claim 2, wherein the power glitch signal detection circuit further comprises:
a third MOS transistor, wherein a gate terminal of the third MOS transistor is connected to the power supply voltage, a source terminal of the third MOS transistor is connected to the gate terminal of the second MOS transistor, and a drain terminal of the third MOS transistor is connected to the drain terminal of the first MOS transistor.

5. The power glitch signal detection circuit according to claim 4, wherein when there is no negative power glitch signal on the power supply voltage and no positive power glitch signal on the ground voltage, then a voltage value of the drain terminal of the third MOS transistor does not change, the signal output module is configured to generate and output a third signal, and the third signal is used to indicate that there is no power glitch signal on the power supply voltage or the ground voltage; when there is a negative power glitch signal on the power supply voltage and/or a positive power glitch signal on the ground voltage, then the voltage value of the drain terminal of the third MOS transistor changes, the signal output module is configured to generate and output a fourth signal, and the fourth signal is used to indicate that there is a power glitch signal on the power supply voltage or the ground voltage.

6. The power glitch signal detection circuit according to claim 1, wherein a source terminal of the second MOS transistor is connected to the gate terminal of the first MOS transistor, and a gate terminal of the second MOS transistor is connected to the power supply voltage.

7. The power glitch signal detection circuit according to claim 1, wherein the power glitch signal detection circuit comprises:
a fourth MOS transistor, wherein one terminal of the capacitor connected to the gate terminal of the first MOS transistor is connected to the power supply voltage through the fourth MOS transistor, and the other terminal of the capacitor is connected to the ground voltage.

8. The power glitch signal detection circuit according to claim 1, wherein the power glitch signal detection circuit further comprises:
a fifth MOS transistor, wherein the drain terminal of the first MOS transistor is connected to the ground voltage through the fifth MOS transistor.

9. The power glitch signal detection circuit according to claim 1, wherein the power glitch signal detection circuit further comprises:
a first inverter, wherein the drain terminal of the first MOS transistor is connected to the gate terminal of the first MOS transistor through the first inverter.

10. The power glitch signal detection circuit according to claim 9, wherein the inverter comprises:
a sixth MOS transistor and a seventh MOS transistor, wherein a source terminal of the sixth MOS transistor is connected to the power supply voltage, a gate terminal of the sixth MOS transistor is connected to a gate terminal of the seventh MOS transistor, a drain terminal of the sixth MOS transistor is connected to a drain terminal of the seventh MOS transistor, a source terminal of the seventh MOS transistor is connected to the ground voltage, and the drain terminal of the sixth MOS transistor is connected to the gate terminal of the first MOS transistor.

11. The power glitch signal detection circuit according to claim 1, wherein the signal output module is a D trigger.

12. The power glitch signal detection circuit according to claim 1, wherein the power glitch signal detection circuit further comprises:
a threshold decision module, wherein the drain terminal of the second MOS transistor is connected to the signal output module through the threshold module, and the threshold decision module is configured to amplify a signal outputted by the drain terminal of the second MOS transistor and to transmit the amplified signal to the signal output module.

13. The power glitch signal detection circuit according to claim 12, wherein the threshold decision module comprises:
an eighth MOS transistor, a ninth MOS transistor, a tenth MOS transistor and an eleventh MOS transistor, wherein a source terminal of the eighth MOS transistor is connected to the power supply voltage, a gate terminal of the eighth MOS transistor is connected to a gate terminal of the tenth MOS transistor, a drain terminal of the eighth MOS transistor is connected to a drain terminal of the tenth MOS transistor, a source terminal of the tenth MOS transistor is connected to the ground voltage, a source terminal of the ninth MOS transistor is connected to the power supply voltage, a gate terminal of the ninth MOS transistor is connected to a gate terminal of the eleventh MOS transistor, a drain terminal of the ninth MOS transistor is connected to a drain of the eleventh MOS transistor, a source terminal of the eleventh MOS terminal is connected to the ground voltage, a drain terminal of the eighth MOS transistor is connected to a gate terminal of the ninth MOS transistor, a gate terminal of the eighth MOS transistor is connected to the drain terminal of the second MOS transistor, and a drain terminal of the ninth MOS transistor is connected to the signal output module.

14. The power glitch signal detection circuit according to claim 13, wherein the eight MOS transistor and the tenth MOS transistor form a second inverter, and the ninth MOS transistor and the eleventh MOS transistor form a third inverter, wherein an inverting threshold of the second inverter is less than that of the third inverter.

15. A security chip, comprising a power glitch signal detection circuit, wherein the power glitch signal detection circuit comprises:
  a voltage sampling module, wherein the voltage sampling module includes:
  a capacitor for sampling a power supply voltage; and
  a first metal oxide semiconductor (MOS) transistor, wherein a gate terminal of the first MOS transistor is connected to the capacitor, a source terminal of the first MOS transistor is connected to a ground voltage, when there is no power glitch signal on the power supply voltage and no power glitch signal on the ground voltage, a voltage value of a drain terminal of the first MOS transistor equals to the ground voltage, and a voltage value of the gate terminal of the first MOS transistor equals to the power supply voltage sampled by the capacitor;
  wherein the power glitch signal detection circuit further comprising a second MOS transistor and a signal output module, wherein
  a terminal of the second MOS transistor is connected to the gate terminal of the first MOS transistor, another terminal of the second MOS transistor is connected to the power supply voltage, and the drain terminal of the second MOS transistor is connected to a drain terminal of the first MOS transistor;
  the signal output module is configured to generate and output a target signal according to change of a voltage value of the drain terminal of the second MOS transistor, and the target signal is used to indicate whether there is a power glitch signal on the power supply voltage or the ground voltage.

16. The security chip according to claim 15, wherein a gate terminal of the second MOS transistor is connected to the gate terminal of the first MOS transistor, and a source terminal of the second MOS transistor is connected to the power supply voltage.

17. The security chip according to claim 16, wherein when there is no positive power glitch signal on the power supply voltage and no negative power glitch signal on the ground voltage, then the voltage value of the drain terminal of the second MOS transistor does not change, the signal output module is configured to generate and output a first signal, and the first signal is used to indicate that there is no power glitch signal on the power supply voltage or the ground voltage; when there is a positive power glitch signal on the power supply voltage and/or a negative power glitch signal on the ground voltage, then the voltage value of the drain terminal of the second MOS transistor changes, the signal output module is configured to generate and output a second signal, and the second signal is used to indicate that there is a power glitch signal on the power supply voltage or the ground voltage.

18. The security chip according to claim 16, wherein the power glitch signal detection circuit further comprises:
  a third MOS transistor, wherein a gate terminal of the third MOS transistor is connected to the power supply voltage, a source terminal of the third MOS transistor is connected to the gate terminal of the second MOS transistor, and a drain terminal of the third MOS transistor is connected to the drain terminal of the first MOS transistor.

19. The security chip according to claim 18, wherein when there is no negative power glitch signal on the power supply voltage and no positive power glitch signal on the ground voltage, then a voltage value of the drain terminal of the third MOS transistor does not change, the signal output module is configured to generate and output a third signal, and the third signal is used to indicate that there is no power glitch signal on the power supply voltage or the ground voltage; when there is a negative power glitch signal on the power supply voltage and/or a positive power glitch signal on the ground voltage, then the voltage value of the drain terminal of the third MOS transistor changes, the signal output module is configured to generate and output a fourth signal, and the fourth signal is used to indicate that there is a power glitch signal on the power supply voltage or the ground voltage.

20. An electronic apparatus, comprising:
  a security chip, comprising a power glitch signal detection circuit, wherein the power glitch signal detection circuit comprises:
  a voltage sampling module, wherein the voltage sampling module includes:
  a capacitor for sampling a power supply voltage; and
  a first metal oxide semiconductor (MOS) transistor, wherein a gate terminal of the first MOS transistor is connected to the capacitor, a source terminal of the first MOS transistor is connected to a ground voltage, when there is no power glitch signal on the power supply voltage and no power glitch signal on the ground voltage, a voltage value of a drain terminal of the first MOS transistor equals to the ground voltage, and a voltage value of the gate terminal of the first MOS transistor equals to the power supply voltage sampled by the capacitor;
  wherein the power glitch signal detection circuit further comprising a second MOS transistor and a signal output module, wherein
  a terminal of the second MOS transistor is connected to the gate terminal of the first MOS transistor, another terminal of the second MOS transistor is connected to the power supply voltage, and the drain terminal of the second MOS transistor is connected to a drain terminal of the first MOS transistor;
  the signal output module is configured to generate and output a target signal according to change of a voltage value of the drain terminal of the second MOS transistor, and the target signal is used to indicate whether there is a power glitch signal on the power supply voltage or the ground voltage; and a processor, wherein the processor is configured to receive the target signal sent by the security ship.

* * * * *